E. J. VON HENKE.
FASTENING METAL PLATES IN SPACED RELATION.
APPLICATION FILED MAY 14, 1917.

1,261,327.

Patented Apr. 2, 1918.

Inventor
Edmund J. von Henke
By his Attorneys
Townsend & Decker

UNITED STATES PATENT OFFICE.

EDMUND J. von HENKE, OF LYNN, MASSACHUSETTS, ASSIGNOR TO THOMSON ELECTRIC WELDING COMPANY, OF LYNN, MASSACHUSETTS, A CORPORATION OF MASSACHUSETTS.

FASTENING METAL PLATES IN SPACED RELATION.

1,261,327.          Specification of Letters Patent.          Patented Apr. 2, 1918.

Application filed May 14, 1917. Serial No. 168,333.

*To all whom it may concern:*

Be it known that I, EDMUND J. VON HENKE, a citizen of the United States, and a resident of Lynn, in the county of Essex and State of Massachusetts, have invented certain new and useful Improvements in Fastening Metal Plates in Spaced Relation, of which the following is a specification.

My invention relates to the manufacture of metal and wood constructions wherein a pair of metallic plates or members are secured together in spaced relation by means of a metal rod passing through a spacing member composed of wood or similar non-heat-resisting material interposed between them.

My invention consists in the process of manufacturing the construction of the general nature described and has for its object to avoid the objections incident to the methods of producing such an article or construction by the use of the heating electric current in the manner heretofore employed. It has before been proposed to manufacture an article consisting of plates or other metal members secured in spaced relation by a rod inserted through the wood or similar element by passing an electric current longitudinally through the rod to bring its ends to plasticity for the purpose of fastening them and the said plates firmly together with the wooden member clamped closely between them. In this process as ordinarily conducted the heating of the ends of the rod is employed for the purpose of bringing them to welding temperature so that they may be welded directly to the plates but the objection to this process, as well as to that modification which employs the upsetting of the end of the rod to rivet it over the outside of the plate or metal member, is that by passing the electric current longitudinally through the rod the whole rod becomes heated and when the spacing member is of such material as wood, it is liable to be injured and an enlargement of the hole may be produced by the heat communicated from the bolt, while furthermore the stem of the bolt being partially softened may yield and buckle or be displaced laterally upon the application of the pressure employed for fastening its ends to or over the metal members.

The object of my invention is to overcome the above objection and to this end my invention consists essentially in assembling the plates in spaced relation with the wooden member between them and with the metal rod passing through said wooden member and in so conducting the heating current through the end portion of the bolt which requires to be brought to plasticity, that the body of the bolt seated in the hole in the spacing member shall remain substantially unaffected.

Figure 1:
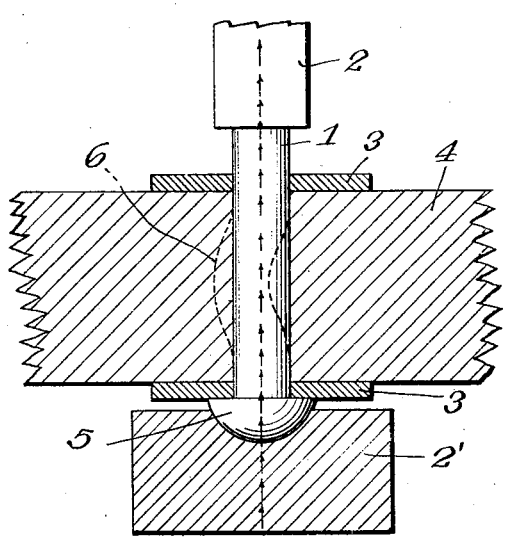
Figure 1 illustrates the method or process as heretofore conducted in a way which is subject to the objections before stated.

Referring to Fig. 1, 3, 3 indicate two metal plates embracing a piece of wood or similar non-heat-resisting material forming a spacing member and secured between said plates by pressure applied to the fastening bolt 1 after it has been brought on its end to the desired plasticity by the passage of a heating current caused to pass longitudinally through the bolt from electrode 2 to electrode 2' or vice versa.

In this operation it will be seen that the whole stem or section of the blank 1 is heated by the electric current in order to bring the end to the desired plasticity for heading. The effect of this is, in the case of material such as wood, that such material is liable to be injured and an enlargement of the hole therein may likewise be produced by the heat communicated from the stem of the rivet. Furthermore, upon the application of the heating pressure, the stem of the rivet blank being softened, may yield and buckle or be displaced laterally as indicated by the dotted line 6, thus interfering with the heading operation.

The object of my present invention is to overcome the above stated objections.

Figure 2:
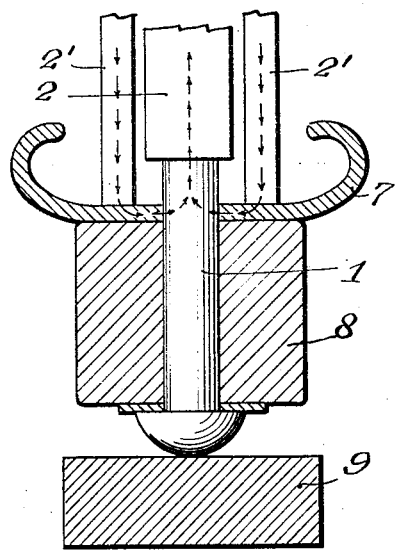
Fig. 2 illustrates the method or process of my invention.

In Fig. 2 I show my invention as applied to the process of fastening a metal rim of a wheel and the metal head of a bolt in spaced relation, the spacing member being the wooden felly of the wheel. 8 indicates the wooden felly and 7 the metal rim while 1 indicates the bolt headed at the inside of the wooden felly. At 9 is indicated a backing plate applied in the process after the parts have been assembled in the desired relation to support the parts during the operation. In this instance the electrodes 2, 2' are applied as shown so that no current will pass through the body of the bolt 1 where it is in contact with the wooden spacing member but will pass, on the contrary, through the end portion of the bolt only by circulating from the bolt laterally to or from the surrounding metal of the rim 7 or other metal member. Hence the body or stem of the bolt will not be heated excepting so far as it may acquire heat by conduction from the end heated by the electric current and therefore none of the objections incident to the former processes, wherein the whole body of the blank is subjected to the heating effect of the current, exist. As will be understood, the parts being assembled in the relation shown the heating current is passed until the end of the bolt acquires the requisite plasticity and the heading of the same is produced by the pressure applied by the electrode 2. The electrode 2' may be likewise used in the process as a pressure device to press the parts 7 and 8 firmly together in order to form a good union of the metal and spacing members. It will also be understood that it is desirable that the end of the bolt should fit rather closely in the perforation in the piece 7 to aid in the conduction of the current laterally. My invention is not limited however to any particular manner or means for causing the heating current to pass laterally through the end of the blank to be headed instead of longitudinally through the whole blank or stem thereof.

Figure 3:
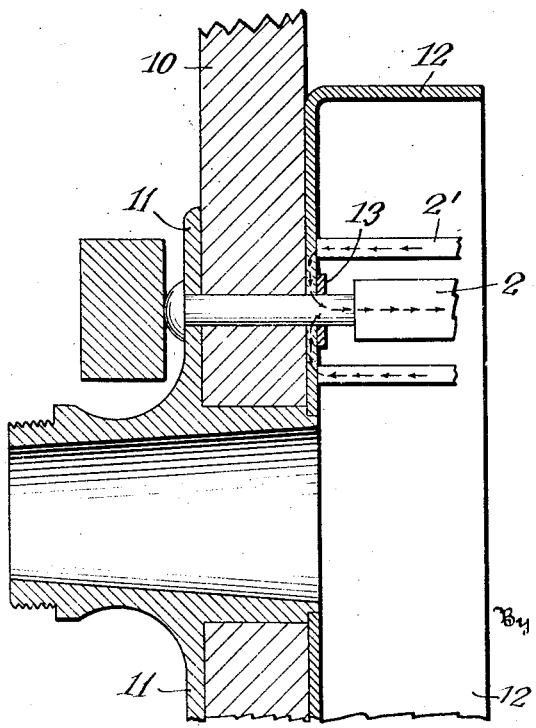
Fig. 3 shows the same method as applied to another form of metal construction.

Fig. 3 shows my invention applied to securing the spokes of a wheel between the hub plate and the brake drum of a vehicle wheel, 10 indicating the spoke, 11 the outside hub plate and 12 the brake drum. In this instance the current is conducted to or from the end of the rod or bolt by attachment of a suitable conductor to the brake drum, current thus being supplied or conducted from the electrode 2 and laterally through the end to be headed in obvious manner. 13 indicates a washer which may be applied on the end of the blank to assist in forming a good electrical connection from the end thereof to the plate or drum 12.

Figure 4:
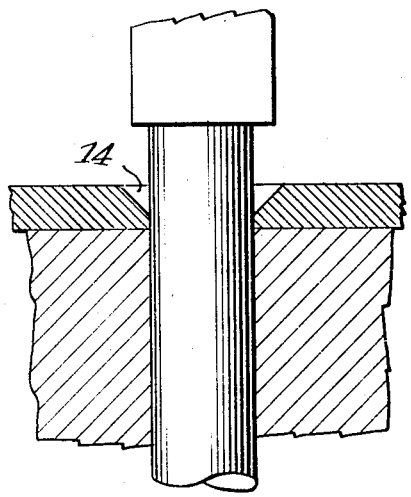
Fig. 4 shows a detail.

As shown in Fig. 4, the plate upon which the end of the blank is headed may be provided with a countersink as indicated at 14 to receive the upset metal.

In the several figures above referred to, the general course of the heating electric current is indicated by lines of small arrows.

What I claim as my invention is:—

1. The herein described method of securing two metal plates or members in spaced relation with a spacing member of wood or similar material interposed between them, consisting in assembling the parts with a metal rod passing through the spacing member, passing heating electric current through the end portion of the rod only and laterally to or from the metal member in which it is seated to bring the end of the bolt to the desired plasticity for fastening the parts together.

2. The herein described method of securing two metal plates firmly together in spaced relation with a spacing member of wood interposed and clamped between them, consisting in assembling the parts in the desired relative position with a bolt passing through the spacing member and through one of said plates or metal members, bringing the end of the bolt to plasticity by means of a heating electric current circulated through the end portion thereof and to or from the metal plate or member and then heading the end of the bolt.

Signed at New York in the county of New York and State of New York this 12th day of May A. D. 1917.

EDMUND J. von HENKE.

Witnesses:
F. B. TOWNSEND,
IRENE LEFKOWITZ.